O. E. TAYLOR.
Milk Cooler.
No. 236,380.               Patented Jan. 4, 1881.
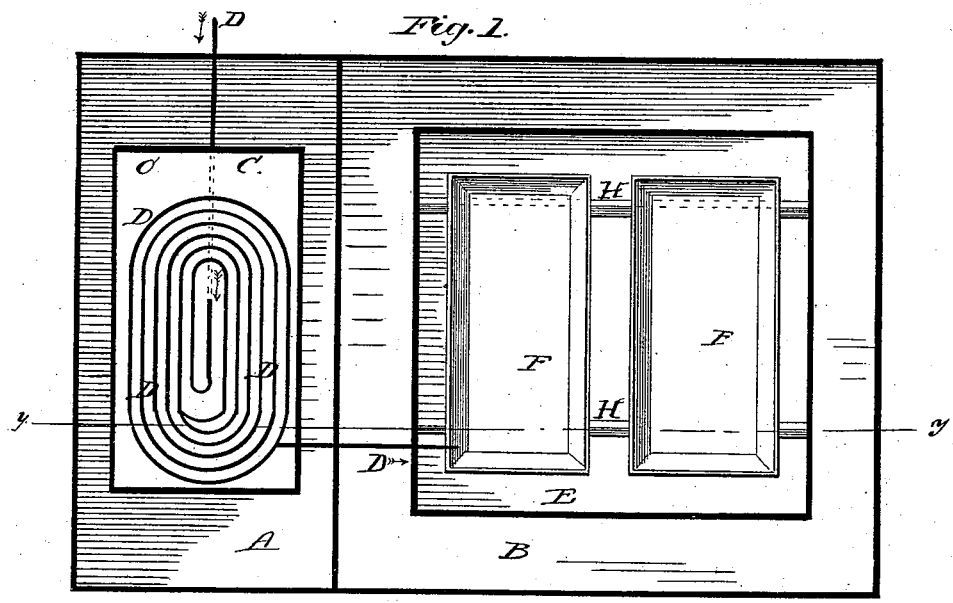
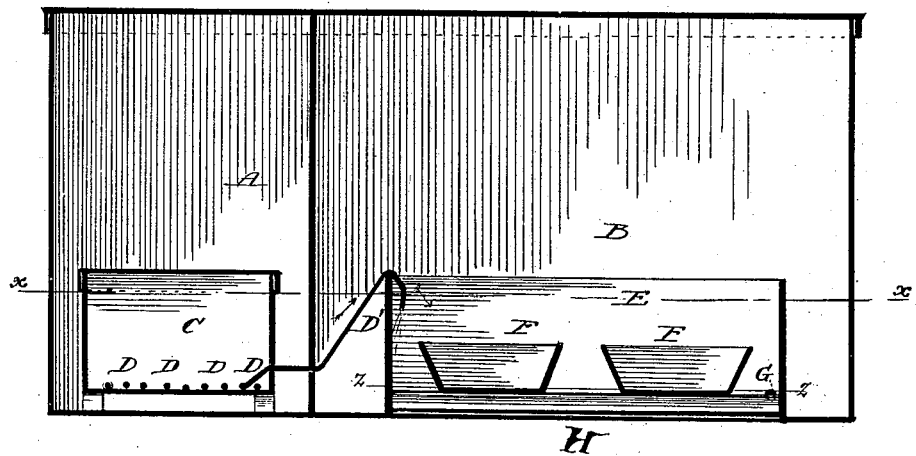
Witnesses
Rod G. Dieterich
Edwin F. Smith
Inventor
Orman E. Taylor
by Daniel Breed Atty.

United States Patent Office.

ORMAN E. TAYLOR, OF GOLDEN PRAIRIE, IOWA.

MILK-COOLER.

SPECIFICATION forming part of Letters Patent No. 236,380, dated January 4, 1881.

Application filed June 28, 1878.

*To all whom it may concern:*

Be it known that I, ORMAN E. TAYLOR, of Golden Prairie, in the county of Delaware and State of Iowa, have invented certain new and useful Improvements in Apparatus for Cooling Milk; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to cooling milk in a creamery having an ice-chamber outside of the milk-room; and it consists in a covered ice-box provided with a coil of pipe for cooling a current of water, in combination with an open water-vat, into which the cold water is discharged, and wherein the milk pans or vessels are set, and in other devices, all of which will be understood by the following description and claim.

In cooling milk in creameries it is found more economical to cool a small quantity of running water and then direct the current into a vat, in which is placed the milk-vessel, and not attempt to cool the whole milk-room.

In the accompanying drawings, Figure is a horizontal section of the ice-chamber A, milk-room B, ice-box C, and water-vat E on the line *x x*, Fig. 2. Fig. 2 is a vertical section of the same, and also of the coiled pipe D, and milk pans or vessels F on the line *y y* of Fig. 1.

My improved apparatus and mode of treating milk are applied in connection with a current of running water, as from a spring flowing through a pipe.

In a small ice room or chamber, A, is placed an ice-box, C, provided with a cover, so that a small portion of ice will be sufficient. In the bottom of this ice-box C is a coil of pipe, D, through which a current of water flows from a spring or other supply, and being thus cooled, is discharged, by the pipe D', into the water-vat E. The water in this vat is very shallow, just covering the bottom of the vat and flowing off by a pipe or opening, G, Fig. 2. On the bottom of vat E are two bars, H, which support the milk pans or vessels E, the water-line rising a little above the bottoms of the milk-pans, as seen at the line *z z*, Fig. 2. By this arrangement the milk is cooled and the large surface of water in vat E constantly absorbs the slight effluvia in the air of the milk-room B, and yet the water soon flows off, carrying away this absorbed effluvia and giving a fresh supply of water, thus preserving the milk, cream, and air all perfectly sweet. By means of this continuous flow of water in and through the open vat E the air in chamber B may be maintained at a desired uniform temperature; also, the effluvia from the milk, which is liable to contaminate the air in chamber B, is constantly absorbed by the open current of water and carried off out of chamber B, the air of which is thus kept pure and the milk and cream perfectly sweet.

By the use of my apparatus very little ice is used—just enough to cool the current of water from the spring, which water is applied directly to the bottoms of the milk-pans, and only kept for a very short time in the milk-chamber B.

The water-vat E has only a shallow current of water, and the bottoms of the pan only are set into this current.

Having described my invention, what I claim is—

In a milk-cooling apparatus having an ice-room, A, and milk-room B, the ice-box C, and coil of pipe D of room A, in combination with open vat E and pan or pans F in room B, the water being cooled in room A, and then discharged, by pipe D', into vat E, and the pan or pans F being set in vat E, and the thin stratum or current of water allowed to rise above the bottom of said pans and soon discharged, as set forth.

In testimony that I claim the foregoing as my own I affix my signature in presence of two witnesses.

ORMAN E. TAYLOR.

Witnesses:
R. W. TIRRIE,
H. F. WHITNEY.